United States Patent [19]

Daeschler et al.

[11] 3,967,938

[45] July 6, 1976

[54] PROCESS FOR THE SEPARATION OF A GASEOUS MIXTURE CONSISTING OF WATER VAPOR, HYDROCARBONS, AND AIR

[75] Inventors: Werner Daeschler, Munich; Hans-Jakob Finkenauer, Mainz-Weisenau; Gerhard Frey, Munich; Hans Rainer, Munich; Walter Schramm, Munich, all of Germany

[73] Assignee: Linde Aktiengesellschaft, Wiesbaden, Germany

[22] Filed: July 22, 1974

[21] Appl. No.: 490,876

[30] Foreign Application Priority Data

| | | |
|---|---|---|
| July 20, 1973 | Germany | 2337055 |
| Oct. 5, 1973 | Germany | 2350115 |
| Oct. 5, 1973 | Germany | 2350114 |
| Dec. 20, 1973 | Germany | 2363504 |

[52] U.S. Cl. ........................ 55/30; 55/82; 62/54; 62/58; 220/85 VR
[51] Int. Cl.² ........................ B01D 53/02
[58] Field of Search .......... 55/30, 80, 82, 269; 62/54, 58, 123; 220/88 VR, 88 VS

[56] References Cited
UNITED STATES PATENTS

| | | | |
|---|---|---|---|
| 3,266,262 | 8/1966 | Moragne | 62/54 |
| 3,400,512 | 9/1968 | McKay | 55/82 X |
| 3,713,303 | 1/1973 | Nilsson et al. | 62/123 |
| 3,791,422 | 2/1974 | Johnson et al. | 62/54 X |
| 3,793,801 | 2/1974 | Tsao | 55/82 X |

*Primary Examiner*—William F. O'Dea
*Assistant Examiner*—Ronald C. Capossela
*Attorney, Agent, or Firm*—Millen, Raptes & White

[57] ABSTRACT

In the dispensing of gasoline into a tank used for the storage or transportation of gasoline wherein the gasoline displaces a gaseous mixture of air and gasoline, and said mixture is treated to a recovery step to separate said gasoline from said mixture, there is provided an improvement in the recovery step which comprises cooling said mixture to condense out the gasoline and water from the air thereby purifying the air, and then separating the water from the gasoline. One or two main heat exchangers can be employed depending on whether the system is operated continuously or not. A short regeneration time is made possible by the use of steam which expands the heat exchange tubes sufficiently to remove ice cleanly. An absorber using activated carbon is optionally employed in addition to the removal of the gasoline by cooling.

4 Claims, 4 Drawing Figures

PROCESS FOR THE SEPARATION OF A GASEOUS MIXTURE CONSISTING OF WATER VAPOR, HYDROCARBONS, AND AIR

BACKGROUND OF THE INVENTION

This invention relates to a process for the separation of the components having a higher boiling point than air from a gaseous mixture consisting of air, hydrocarbons, and water vapor.

When replenishing partially or already completely emptied gasoline tanks, for example, large underground storage tanks for gasoline stations and/or for road rail vehicles, but in particular also the storage tanks of the refineries, large amounts of a gasoline-air mixture are produced, the volume of which corresponds essentially to the volume of the replenished gasoline and which, due to atmospheric moisture, also contains water vapor. Heretofore, this gaseous mixture consisting of hydrocarbons, water vapor, and air has been exhausted directly into the atmosphere which, on the one hand, represents a source of constant danger due to the explosiveness of the mixture and, on the other hand, and herein resides the gravest disadvantage, leads to a continuous contamination of the atmosphere around the storage tanks.

An earlier patent application (P 23, 25, 421.9) has already suggested a process for the recovery of the hydrocarbons contained in a gasoline-air mixture, wherein the hydrocarbons are scrubbed out of the gasoline-air mixture in a special washing column. The disadvantage of this process, which is effective per se, resides in the relatively large expenditure in apparatus to conduct same. Additionally, the process is relatively inflexible with respect to fluctuations in quantity per unit time of the thus-obtained gasoline-air mixture.

The invention is based on the problem of providing a simple process for the recovery of the hydrocarbons contained in a gaseous mixture consisting of water vapor, hydrocarbons, and air, especially the hydrocarbons contained in a gasoline-air mixture.

This problem is solved, in accordance with the invention, by effecting the separation of the hydrocarbons and of the water vapor by condensation and solid precipitation in a cooled heat exchanger and/or by adsorption on a solid adsorbent.

According to the invention, the separation of the hydrocarbons and the water vapor from the gaseous mixture is accomplished in a simple manner by condensing or freezing out these components during the course of the cooling of the gaseous mixture in a heat exchanger. The gaseous mixture flows through the heat exchanger from the bottom toward the top, thus being cooled in heat exchange with a refrigerant evaporating from a separate cross section of the heat exchanger. During the course of the cooling to which the gaseous mixture is subjected while flowing through the heat exchanger, first a portion of the hydrocarbons is condensed, which portion can be directly withdrawn as product. The velocity of the gaseous mixture introduced into the heat exchanger is dimensioned so that the kinetic energy is not sufficient to entrain thus-formed droplets of condensate into colder regions of the heat exchanger. In this way, it is possible to separate already the largest portion of the hydrocarbons contained in the gaseous mixture in a temperature range lying above the melting temperature of the hydrocarbons. Only a relatively minor remainder of the hydrocarbons and a portion of the water vapor are frozen out within the heat exchanger and, after some time, lead to obstructions within the heat exchanger.

If the gaseous mixture to be separated is fed discontinuously, the regeneration of the heat exchanger takes place during time periods where no gaseous mixture is introduced. The heat exchanger, in this case, is dimensioned so that the entire quantity of gaseous mixture charged between two regenerating intervals can be processed.

The process of this invention can be applied with particular advantage to the purification of hydrocarbon-air mixtures obtained, for example, in refineries during the charging of hydrocarbons into available transport vehicles. Since, normally, the hydrocarbons are only loaded during the day, the heat exchangers are dimensioned so that the entire quantity of gaseous mixture produced during the course of a day can be purified in one continuous operation. The regeneration of the heat exchangers, i.e. the thawing of the solid deposits, then takes place during the night by the introduction, by means of blowers, of ambient air, brought to a slight superatmospheric pressure and thus warmed, into the heat exchangers.

Advantageously, the warming of the air is accomplished in the blower which, during the day, conveys the gaseous mixture to be purified into the plant.

In case the gaseous mixture to be treated is obtained continuously, the gaseous mixture is advantageously processed in two alternating heat exchangers wherein, once one of them is loaded, the operation is switched over to the other one.

In this instance, it is especially advantageous to employ the gasoline-air mixture to be treated for the direct regeneration of a loaded heat exchanger. For this purpose, warm gasoline-air mixture is first fed to the load heat exchanger flowing through the latter from the top toward the bottom, thereby melting off the congealed hydrocarbons. Thereupon, the gaseous mixture and the melted hydrocarbons are subjected to a phase separation in a separator. The gaseous mixture obtained during the phase separation is now fed to the second heat exchanger and cooled therein. The hydrocarbons which condense during the cooling step are likewise recycled into the separator, while the frozen-out hydrocarbons are precipitated on the heat-exchange surfaces of the heat exchanger and eventually lead to clogging of the latter.

The condensate obtained in the separator can be withdrawn as product from the plant. However, it is advantageous to subject this condensate to a supplemental water-separating step, since it is unavoidable, owing to the moisture in the air, that water also condenses and/or freezes out in the heat exchangers in addition to the hydrocarbons.

The refrigeration required for the process is made available by a vaporizing refrigerant which is advantageously conducted in a closed cycle.

In order to make available to the plant the cold of the residual gas which is obtained after the condensation and/or freezing out of the hydrocarbons and optionally of the water, this residual gas is expanded according to a further feature of this invention, before being withdrawn from the plant, and warmed in a further cross section of the heat exchanger in heat exchange with the waste gas to be cooled.

The process of this invention can be utilized with the same advantages also in connection with special heat exchangers, such as alternating regenerators or so-called "reversing exchangers."

The process of this invention, as well as the corresponding devices to conduct same are distinguished by simplicity as well as great flexibility with respect to chronological quantity fluctuations of the gaseous mixture to be processed.

Accordingly, the apparatus of this invention is particularly advantageously suitable for installation on vehicles for the transport of gasoline. The apparatus can, for example, be fixedly mounted to a tanker truck and can thus be utilized economically during the filling of the gasoline truck, to process the gasoline-air mixture obtained from the tank of the gasoline vehicle, and can also be utilized when filling the gasoline from the gasoline truck into a fixed storage tank, e.g. in a gasoline station, to process the gasoline-air mixture now obtained from the storage tank of the gasoline station.

Besides the already described methods for the regeneration of a loaded heat exchanger, a further, particularly effective method resides in that a hot stream of steam is introduced for a brief period of time into the heat exchanger cross section wherein normally the residual gas fraction freed of hydrocarbons and water vapor is rewarmed.

It has been found that the short-term introduction of a hot stream of steam, a so-called steam jet, into the cross section for the residual gas fraction causes especially the ice on the outer surface of the cross section to break up immediately into small pieces and to drop away from the surface, the latter remaining completely dry. Due to the large heat transfer coefficient of the steam condensing on the inner surface of the cross section, the cross section is very rapidly warmed up from the inside; this is so, because due to the poor thermal conductivity of the ice adhering to the outer surface, almost no warmth penetrates into the ice proper. The rapid heating of the metallic cross section is connected, due to the cubic thermal expansion coefficient, with a quick and relatively strong expansion, leading to fragmentation of the brittle ice layer. Since the bonding forces between the ice layer and the outer surface of the cross section are small, the ice breaks away from the outer surface without leaving any traces.

In many cases, it is not at all necessary to raise the mean cross section temperature during regeneration above the melting point of the ice. This holds true, in particular, if the production process takes place previously at very low temperatures (about −60° C. to −80° C.) and thus there is a sufficient temperature interval between the normal production temperature and the melting point of the ice, within which the relative temperature elevation of the cross section can adjust itself. Since, on the one hand, the ice need not at all be melted and, on the other hand, no large secondary masses need to be warmed due to the astonishingly short time of the regenerating process, the total heat requirement is relatively minor. The regenerating times are reduced to a few minutes.

According to a further feature of the invention, a large part of the cold can be recovered if the ice pieces obtained during the regeneration are collected in the lower portion of the heat exchanger, e.g. of a reflux condenser, and the gaseous stream to be purified is conducted through and/or over the ice pieces. In this heat exchange, the ice chunks are melted and give off the largest portion of their cold to the introduced gaseous mixture, whereby the latter is already precooled.

With the usually ambient conditions, the gaseous mixture has a temperature of about 30° C. and a relative humidity of about 50–60%. However, this means that the partial pressure of the water vapor in the gaseous mixture is substantially higher than the water vapor pressure of the ice of at most 0° C. at the bottom of the reflux condenser. From the ambient partial pressure difference, a considerable portion of the water vapor entrained with the arriving gaseous mixture is already condensed and separated in the ice charge. Thus, the additional advantage is attained that initially less water can settle in the form of ice within the heat exchanger.

It was found that the thus-produced ice pieces can fall downwardly unhindered within the reflux condenser, if the minimum spacing between the cross section for the residual gas fraction and a cross section for a refrigerant is at least as large as approximately 1.5 – 2 times the diameter of the cross section for the residual gas fraction.

The condensed water remaining in the cross section after the steam jet has been applied is forced out, while the tube wall is still warm, after reversing by the exhaust gas and/or the product gas. Any remaining residual moisture is likewise removed by the product gas, since the latter, after flowing through the cold outer space of the reflux condenser, is in any event sufficiently dry. Even ice particles which may be formed in the interior of the pipe coil are in this way removed in the course of time.

Since the regenerating period is only a few minutes long, it is advantageous not to inactivate the refrigerating unit during this time, i.e. the cooling of the reflux condenser is continued. The cold losses incurred because the purified gas obtained at the head of the reflux condenser is now introduced into the atmosphere in the cold condition are negligible due to the shortness of the regenerating period.

According to a further feature of the invention, the obtained gaseous mixture is separated by means of a solid adsorbent which adsorbs the hydrocarbons and the water vapor and allows the air to pass through unhindered. The adsorbent is regenerated by means of water vapor, wherein the exhaust gas obtained during the regeneration and consisting of hydrocarbons and water vapor is preliminarily separated to segregate at least the largest portion of the water vapor, and the residual gas obtained during the preliminary separation, consisting essentially of hydrocarbons, is compressed and thereafter cooled.

Due to the fact that the exhaust gas obtained during the regeneration of the adsorber is subjected to a preliminary separation wherein already the largest portion of the water vapor is separated, the amount of the residual gas enriched with hydrocarbons is relatively small, so that relatively small compressors can be utilized for the compression step. After the compression, the residual gas is cooled, for example by means of a water cooler, so that the hydrocarbons are condensed and are available as a liquid final product.

It proved to be especially advantageous to effect the preliminary separation of the waste gas, obtained during the regeneration of the adsorber and consisting of hydrocarbons and water vapor, by means of water cooling. During this procedure, the water vapor is almost completely condensed, so that the residual gas produced during the preliminary separation consists almost exclusively only of hydrocarbons.

If several hydrocarbons with various boiling points are contained in the gaseous mixture to be treated, it is advantageous to provide a multistage compression of the residue gas and to condense, after each compression stage, respectively a portion of the hydrocarbons, for example by air or water cooling.

The invention satisfies two important requirements. On the one hand, it is possible thereby to obtain air of almost any desired purity from a gaseous mixture consisting of hydrocarbons, thus making a considerable contribution toward the avoidance of atmosphere contaminations, and, on the other hand, it is thus made possible to recover the hydrocarbons, in a simple and energy-saving process, in an almost pure condition in the liquid phase, so that these hydrocarbons can be passed on directly to further use, for example as high-quality energy carriers.

Additional explanations of the invention can be derived from the embodiments thereof, schematically illustrated in the figures.

Figure 1:
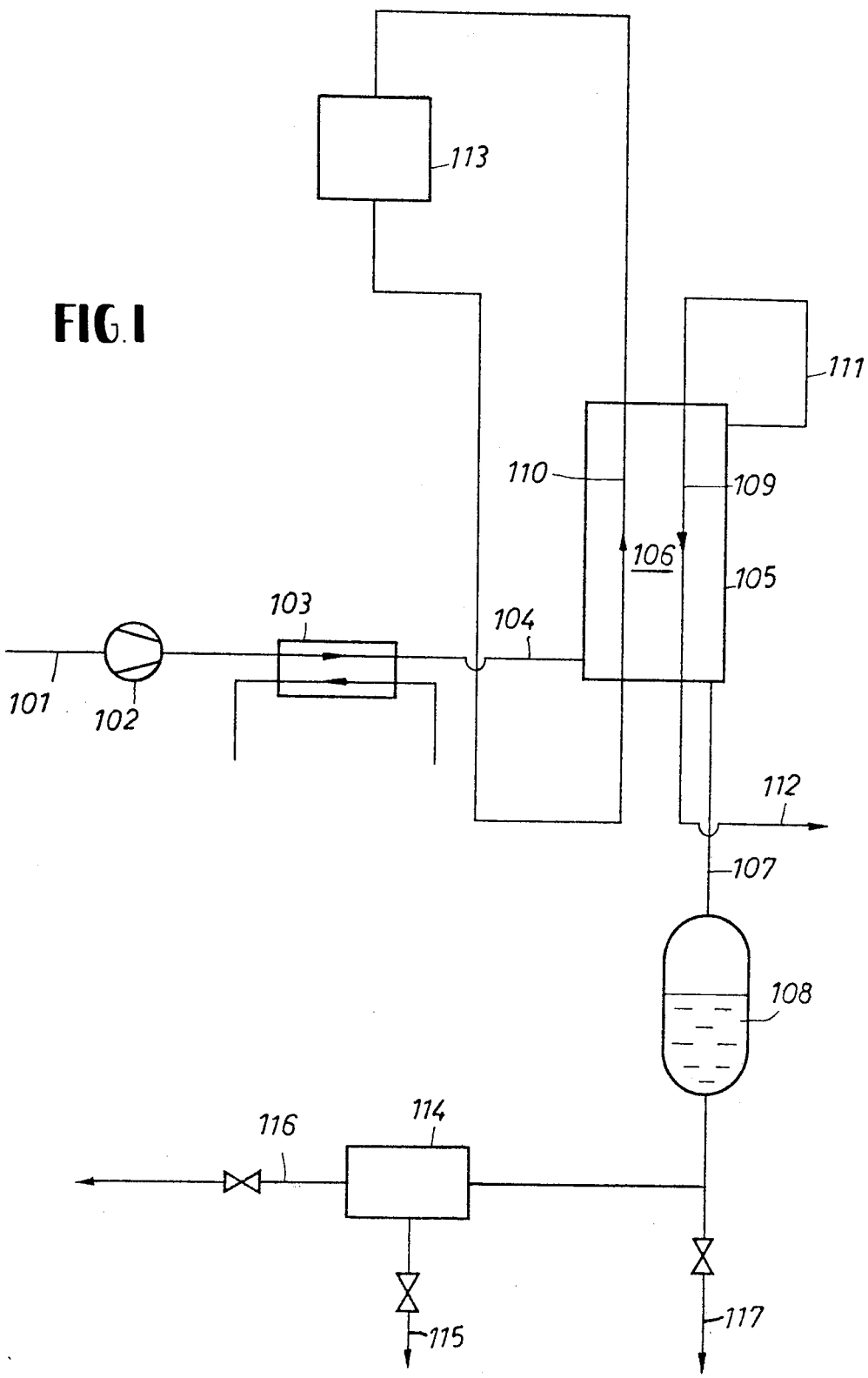
FIG. 1 shows an embodiment for discontinuous operation.

According to FIG. 1, the gasoline-air mixture produced during the day when filling gasoline storage tanks of a refinery, which mixture due to atmospheric humidity is also enriched with water vapor, is fed to the plant via conduit 101, compressed in the blower 102 to about 1.5 atmospheres absolute, and subsequently cooled in the cooler 103 to about 40° C. By way of conduit 104, the gaseous mixture enters the single heat exchanger 105; in the outer chamber 106 of the latter, the mixture is cooled to about −55° C. During the course of this cooling step, a portion of the water vapor and the hydrocarbons are condensed and flow into the collecting vessel 108 via conduit 107. The remainder of the water vapor is deposited in the form of ice on the outer surfaces of the heat exchanger cross sections 109 and 110.

The cold, extensively purified air obtained in the upper, i.e. coldest, zone of the heat exchanger 105 is withdrawn via conduit 111, warmed to about 10° C. in the cross section 109 of heat exchanger 105 in indirect heat exchange with entering gaseous mixture, and is finally withdrawn from the plant via conduit 112. The cold required for the cooling step and the partial condensation of the gaseous mixture is made available by a suitable refrigerant conducted in a closed cycle, such as "Freon," which is liquefied in the cooling station 113 and vaporized in the cross section 110 of heat exchanger 105.

The liquid mixture of hydrocarbons and water obtained in the collecting vessel 108 flows into the water-separator 114, from which the water is discharged via conduit 115 and the hydrocarbons, i.e. the gasoline, are withdrawn by way of conduit 116.

The heat exchanger 105 is dimensioned so that the entire amount of gaseous mixture obtained during one day in the refinery during the loading of gasoline can be processed. The heat exchanger 105 is regenerated, i.e. the ice formed in the heat exchanger 105 is thawed off, during the night, i.e. in an interval where no gaseous mixture is produced in the refinery. For this purpose, the cold-producing unit 113 and the air cooled 103 are inactivated. Thereupon, air is conveyed via conduit 101 and the blower 102 into the heat exchanger 105. During passage through the blower, the air is warmed. Within the heat exchanger 105, the warm air thaws the ice. The thus-produced water flows via conduit 107 into the collecting vessel 108 from which it is finally discharged to the outside by way of conduit 117.

The blower 102, the heat exchangers 103 and 105, as well as the pipelines connecting these components with one another are designed for the ignition pressure of the produced gasoline-air mixture, so that a preceding saturation of the gasoline-air mixture with hydrocarbons is unnecessary.

The heat exchanger can also be regenerated with another warm gas or even with a warm liquid, such as, for example, the liquid, not yet expanded refrigerant. Such a gas or such a liquid can also be utilized additionally to the air for regenerating purposes, in order to accelerate the regeneration process.

Figure 2:
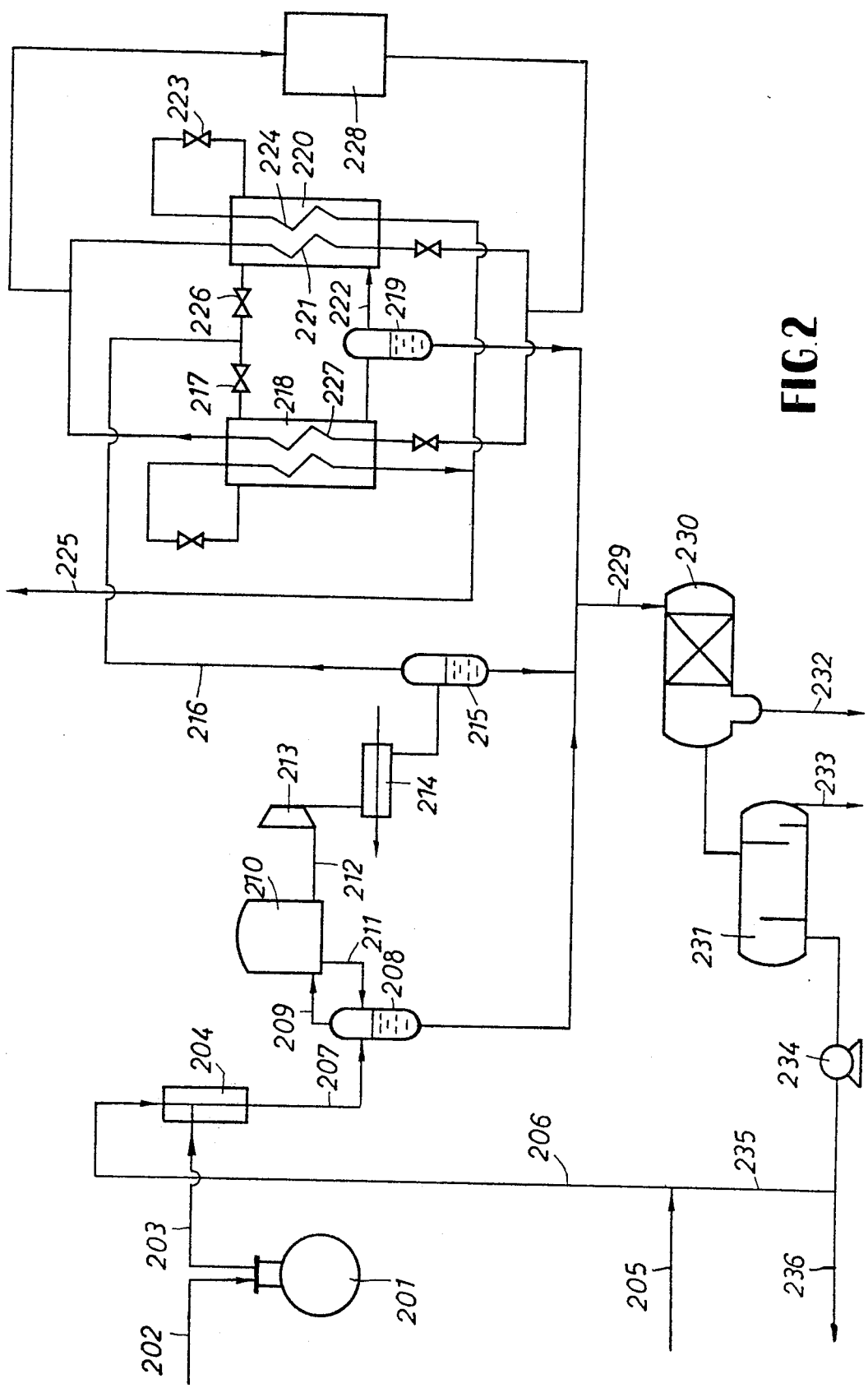
FIG. 2 shows an embodiment for continuous operation.

A further embodiment of the invention wherein the hydrocarbons are separated in two alternating heat exchangers is illustrated in FIG. 2.

According to FIG. 2, the gasoline-air mixture obtained during the filling of a gasoline tank 201 with fresh gasoline introduced via conduit 202, which mixture due to atmospheric humidity is also enriched with minor amounts of water, is discharged via conduit 203 and fed to a mixing unit 204 wherein it is completely saturated with fresh gasoline introduced via conduits 205 and 206. The saturation is advantageous for safety reasons, since the gasoline-air mixture obtained by way of conduit 203 is very explosive and thus represents a source of constant danger.

From the mixing device 204, the gasoline-air mixture, presently gasoline-saturated, is conducted via conduit 207 to the separator 208 wherein condensate is collected which is formed in the conduit 207 due to changing atmospheric conditions. The gaseous phase, i.e. the saturated gasoline-air mixture, obtained in the separator 208 is fed via conduit 209 to a gasometer 210 serving as a buffer. Condensate can also be formed in the gasometer 210 due to varying atmospheric conditions, this condensate being recycled into the separator 208 by way of conduit 211.

The gasoline-air mixture to be treated is now withdrawn from the gasometer 210 via conduit 212, compressed in compressor 213 to a pressure of about 2–5 atmospheres absolute, partially condensed in the water cooler 214, and subjected to a phase separation in the separator 215. The gaseous phase obtained during this phase-separation step, consisting essentially of a no longer saturated mixture of air and hydrocarbons, is discharged from the separator 215 via conduit 216 and flows, in the presently existing switching phase, via the opened valve 217 first through the loaded heat exchanger 218, which is thereby regenerated; then through the separator 219; and finally through the heat exchanger 220 which is not loaded in this switching phase and is cooled by means of a refrigerant being vaporized in the pipe coil 221.

During the course of the cooling step to which the gasoline-air mixture is subjected while flowing through the heat exchanger 220 from the bottom toward the top, a portion of the hydrocarbons as well as of the water contained in the mixture is first condensed and flows back into the separator 219 via conduit 222. The remainder of the hydrocarbons and water is frozen out and is deposited in the form of solid precipitant essentially on the heat-exchange surfaces in the upper region of the heat exchanger 220.

After flowing through the heat exchanger 220, the residual gas, presently extensively freed of hydrocarbons, i.e. the gasoline, and water, is expanded in the valve 223, warmed in the pipe coil 224 of the heat exchanger 220, and finally discharged from the plant as a harmless waste gas via conduit 225.

As soon as the heat exchanger 220 is completely loaded, the two alternating heat exchangers 218 and 220 are switched over so that now the gasoline-air mixture introduced via conduit 216 is first fed, via the presently opened valve 226, to the heat exchanger 220, melting off the solid deposits formed therein, and then to the heat exchanger 218, which is now cooled by refrigerant evaporating in the pipe coil 227; in this latter heat exchanger, the hydrocarbons as well as the water contained in the gasoline-air mixture are separated. The solid deposits molten off within the heat exchanger 220 flow, via conduit 222, likewise into the separator 219.

The cold required for the separation of the hydrocarbons and the water in heat exchangers 218 and 220 is made available by a cycle medium, e.g. propane, conducted in a closed refrigerating cycle, which is cooled and liquefied in the cooling unit 228 and vaporized, in correspondence with the respectively existing switching phase, in the pipe coils 221 and 227, respectively, of the heat exchangers 220 and 218, respectively.

The liquid fractions obtained in separators 208, 215, and 219, composed essentially of the hydrocarbons to be recovered and water, are first introduced via the common conduit 229 into a device for water separation, consisting for example of a coalescing unit 230 and a separating vessel 231. The thus-separated water is discharged from the plant via conduits 232 and 233, while the recovered gasoline is fed in part, by means of pump 234, via conduit 235 directly into the fresh gasoline conduit 206 and, for the remaining part, likewise discharged from the system via conduit 236.

Figure 3:
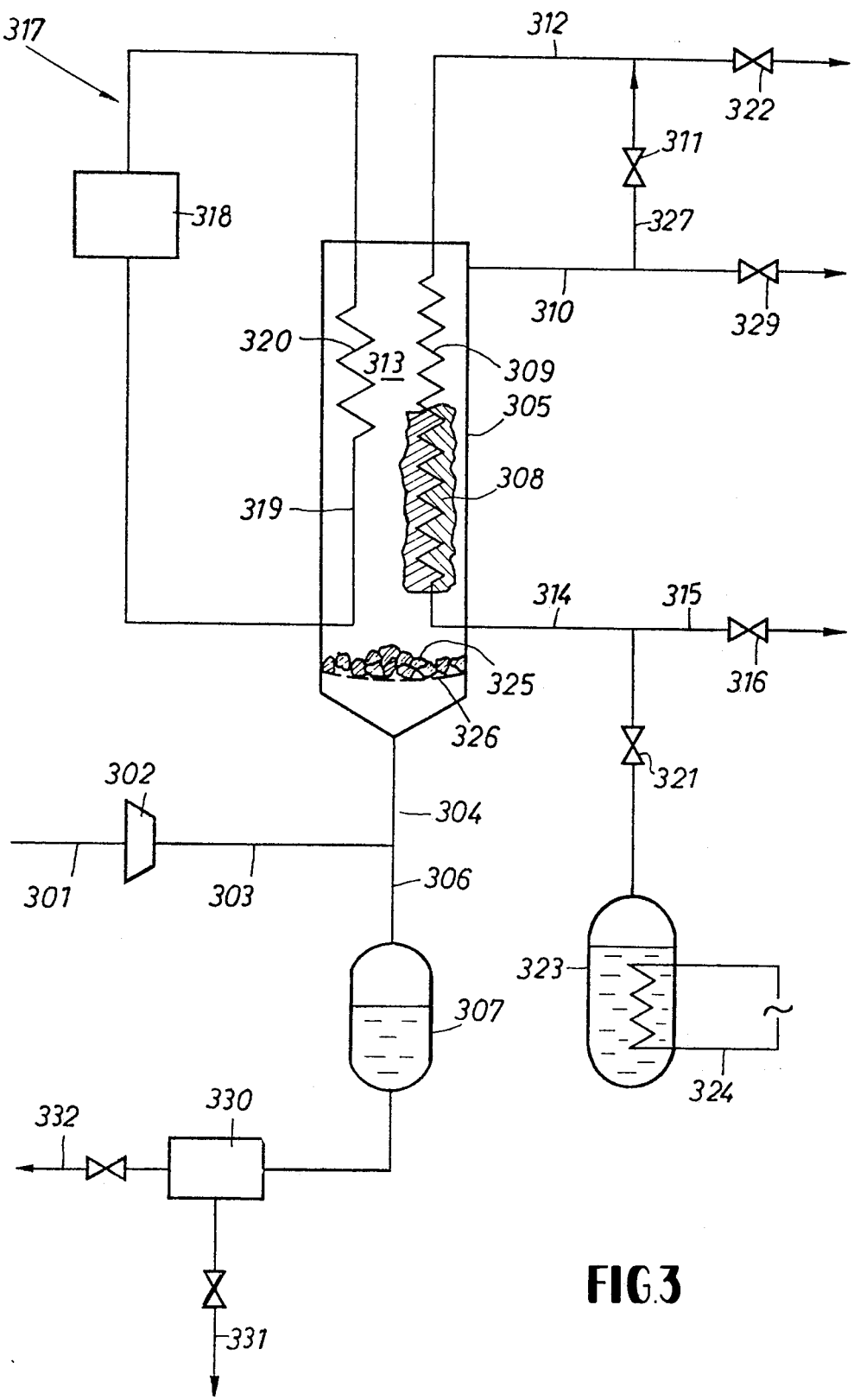
FIG. 3 shows an embodiment for the regeneration of a heat exchanger.

An embodiment of the invention showing a particularly advantageous method for the regeneration of a loaded heat exchanger is shown in FIG. 3.

According to FIG. 3, a gasoline-air mixture to be treated, which is also enriched with water vapor due to the ambient atmospheric moisture, is fed to the system via conduit 301 and compressed to a slightly superatmospheric pressure in compressor 302. Via conduits 303 and 304, the gaseous mixture flows into the reflux condenser 305 wherein it is subjected to continuous cooling. During the course of this cooling step, a portion of the water vapor is first condensed and flows, via conduits 304 and 306, into the collecting vessel 307. The water which is not condensed is deposited, at a lower temperature, in the form of ice 308 on the outer surface of the product coil 309. In the upper, i.e. coldest zone of the reflux condenser 305, the hydrocarbons are predominantly condensed, i.e. the gasoline, which likewise flows into the collecting vessel 307. The air obtained at the head of the column, which is now extensively freed of higher-boiling components, is fed via conduit 310, the opened valve 311, and conduit 312, into the product coil 309, warmed in heat exchange with the gaseous mixture rising in the outer space 313 of the reflux condenser, and is finally forced out of the system via conduits 314 and 315, as well as the opened valve 316.

The refrigeration required in the reflux condenser 305 is made available by a refrigerant conducted in a closed refrigerating cycle 317, for example R 22, which is liquefied in the cold unit 318 and vaporized in the cooling coil 319 of the reflux condenser 305. Since the largest cold requirement exists in the upper zone of the reflux condenser, wherein the largest portion of the hydrocarbons is condensed, the greatest part of the cold transfer surface is in the upper region of the reflux condenser, as indicated by the coil 320. The total heat exchange surface of the cooling coil proper is only 10–20% of the heat exchange area of the product coil 309, since the heat transfer from the refrigerant evaporating in the cooling coil 319 and here especially in the zone 320 is substantially better than the heat transfer from the extensively purified air flowing in the product coil. This design has the result that the water frozen out during the cooling of the entering gas is deposited predominantly on the outside of the product coil.

As soon as this ice layer has reached a no longer tolerable thickness, the reflux condenser is regenerated. For this purpose, the valves 316 and 311 are closed, and the valves 321, 322, and 329 are opened. At this point, a short-term hot steam jet is passed from the steam vessel 323, wherein the water is vaporized by means of the heater 324, via the opened valve 321 and the conduit 314 into the product coil 309; this steam jet results, due to the good thermal conductivity of the metallic product coil 309 and the poor thermal conductivity of the ice 308, in a rapid heating of the product coil and, due to the relatively large coefficient of thermal expansion, in a strong expansion of the product coil. Thereby, the brittle ice layer 308, having a strength of only about 10 kp./cm$^2$, is burst open at many points. Since the bonding forces within the ice layer are greater than the bonding forces between the ice layer and the outer surface of the product coil 309, the ice cracks away without leaving any traces and falls in the form of individual pieces 325 downwardly within the outer space 313 of the reflux condenser 305. In the lower zone of the reflux condenser 305, the ice chunks 325 are collected by means of a collecting device 326 provided with openings, and are melted in direct heat exchange with warm gaseous mixture entering via the conduits 303 and 304.

After the regenerating step, which lasts normally only a few minutes, has been terminated, the system is again switched to normal operation, i.e. the valves 321, 322, and 329 are closed, and the valves 316 and 311 are opened.

The purified, cold and dry air which is now again introduced via conduits 310, 327, and 312 into the product coil 309 and stems from the upper zone of the reflux condenser drives out the water vapor condensed in the product coil during the regenerating step and completely dries the interior of the product coil.

It was found that the operation of the reflux condenser can be continued during the regeneration, but in this case the purified air is exhausted in the cold condition via conduits 310 and 328 and via the opened valve 329 directly into the atmosphere.

The mixture of water and hydrocarbons obtained in the collecting vessel 307 is fed to a water separator 330, from which the water is withdrawn via conduit 331 and the recovered hydrocarbons are discharged via conduit 332.

Figure 4:
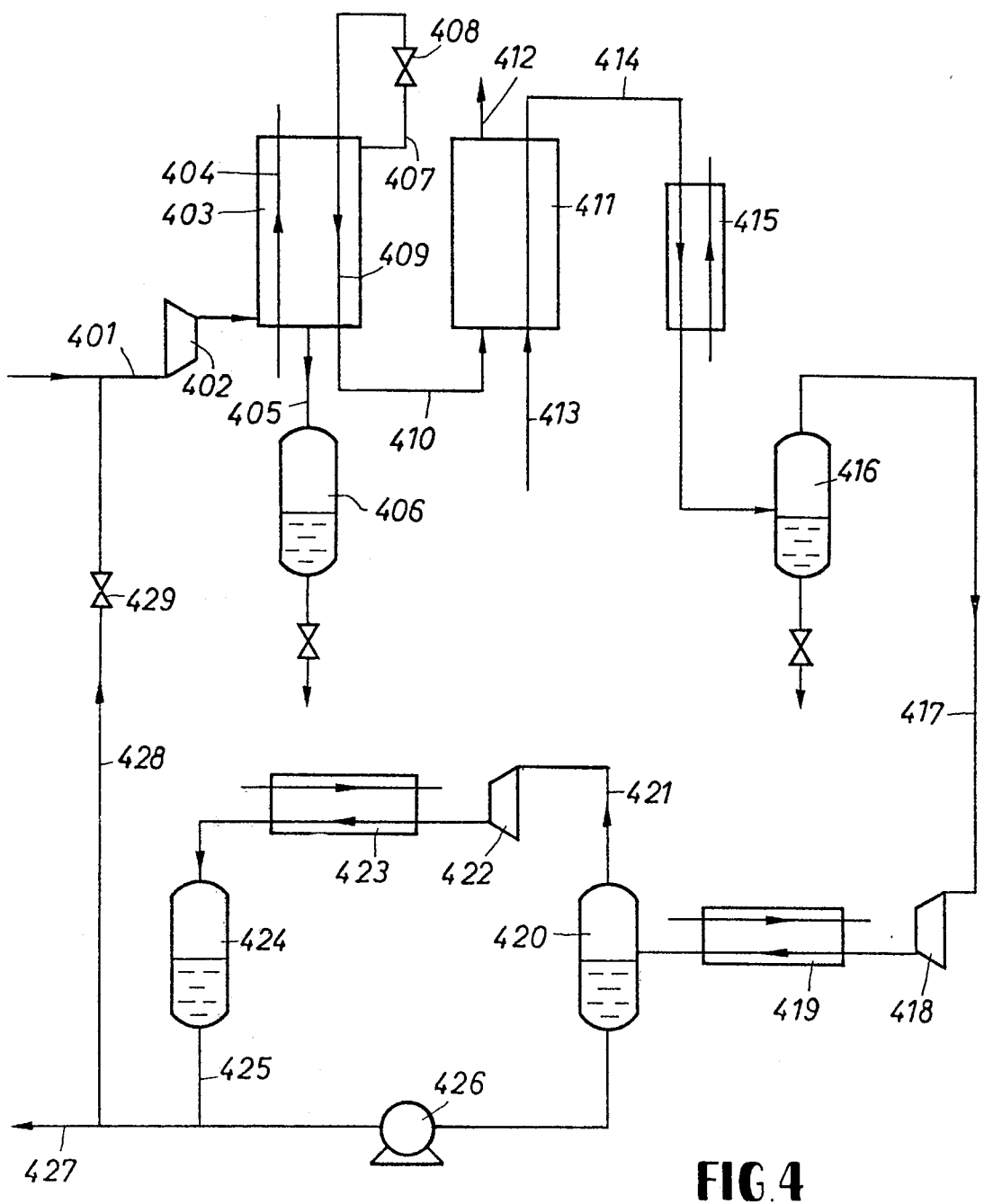
FIG. 4 shows an embodiment wherein the separation of the gaseous mixture is effected by means of an adsorber.

A further embodiment of the invention, wherein the hydrocarbons are separated by the adsorption method is shown in FIG. 4.

According to FIG. 4, the gaseous mixture to be treated, consisting of hydrocarbons within the gasoline range and of air is fed to the system via conduit 401, compressed to about 9 atmospheres absolute in the compressor 402, and thereupon cooled to about 40° C. in heat exchanger 403 in heat exchange with a refrigerant flowing in the cross section 404. During this heat exchange, a portion of the hydrocarbons is condensed and flows by way of conduit 405 into the collecting vessel 406. The residual gas mixture produced in the head of the heat exchanger 403, composed essentially of air and minor amounts of hydrocarbons, is withdrawn via conduit 407, expanded in valve 408, rewarmed in the cross section 409 of heat exchanger 403, and thereafter fed, via conduit 410, to an adsorber 411 with activated carbon as the adsorbent, wherein the hydrocarbons contained in the residual gas mixture are completely separated, so that almost pure air can be withdrawn by way of conduit 412.

As soon as the adsorber 411 is laden with hydrocarbons, this adsorber is regenerated. For this purpose, hot steam is fed via conduit 413. The waste gas produced during the course of the regeneration and consisting of steam and hydrocarbons is discharged by way of conduit 414 and cooled in the water cooler 415 to a temperature lying approximately between 20° and 35° C.

During the course of this cooling step, the water vapor contained in the waste gas is almost completely separated by condensation. The thus-obtained water is removed in separator 416.

In the head of the separator 416, a residual gas is obtained which essentially contains only hydrocarbons. This residual gas is withdrawn from the separator 416 via conduit 417, compressed to about 3 atmospheres absolute in a first compression stage 418, partially condensed in water cooler 419, and subjected to a phase separation in separator 420.

The lower-boiling hydrocarbons which have not been liquefied are removed from the separator 420 via conduit 421, compressed to about 9 atmospheres absolute in a second compression stage 422, then entirely liquefied in the water cooler 423, and introduced into the collecting vessel 424. From the latter, the liquid, lower-boiling hydrocarbons are withdrawn by way of conduit 425 and combined with the higher-boiling liquid hydrocarbons obtained in separator 420, which are compressed to the pressure of the second compression stage by means of the pump 426.

The combined quantity of liquid hydrocarbons can be fed, via conduit 427, directly to a storage tank, not shown herein. However, it is also possible to readmix this combined quantity, at least partially, to the gaseous mixture entering via conduit 401, by conducting the quantity via conduit 428 and the expansion valve 429. The second possibility is advantageous, in particular, if the available gaseous mixture has a hydrocarbon concentration within the explosion limit. By this admixing step, it is possible to raise the hydrocarbon concentration above this explosion limit and thus to substantially increase the safety of the process.

Since the amount of residual gas obtained in the separator 416 is very low, being on the order of magnitude of only a few per thousand of the produced amount of gaseous mixture, a compressor containing the compression stages 418 and 422 can be designed to be relatively small, so that the initial investment cost and the energy requirement for conducting the process are, in total, only minor.

If a continuous operation of the process is desirable or necessary, the adsorber 418 can be replaced by an alternating adsorber system consisting of two adsorbers wherein one adsorber is being regenerated while the other is being charged.

In case solid deposits are produced in the heat exchanger 403, for example frozen out water vapor contained in the mixture to be treated due to the atmospheric humidity, it is also possible to replace the heat exchanger 403 by an alternating heat exchanger system consisting of at least two heat exchangers.

By means of the combination of heat exchanger 403 with adsorber 411, a portion of the hydrocarbons can already be separated directly from the hydrocarbon-air mixture without excessive cooling already within the heat exchanger 403, while the remainder of hydrocarbons which would require a relatively large amount of cooling for the direct separation in heat exchanger 403 need not be separated from a hydrocarbon-air mixture, but rather merely from a hydrocarbon-water vapor mixture.

A further advantage of the combination of heat exchanger 403 and adsorber 411 resides in that, in total, smaller adsorbers can be utilized.

The above-explained process is suitable particularly advantageously for the recovery of the gasoline contained in a gasoline-air mixture.

What is claimed is:

1. A process for the separation of hydrocarbons from a compressed gaseous mixture consisting essentially of air, hydrocarbons and water vapor, said process comprising cooling said gaseous mixture in a heat exchanger cooled by indirect heat exchange relationship with a closed refrigeration cycle, said cooling of said gaseous mixture being conducted in a first stage within said cooled heat exchanger to form a liquid condensate of water and hydrocarbons, and in a second stage in said cooled heat exchanger to freeze out residual hydrocarbons and water to form solid deposits on the tube surfaces of the heat exchanger; removing the air freed of water and hydrocarbon from said cooled heat exchanger, said cooled heat exchanger being a regenerated heat exchanger (220) of two alternating heat exchangers (218, 220), said gaseous mixture to be treated, prior to being cooled in the regenerated heat exchanger (220) having been utilized for the regeneration of the other heat exchanger (218) loaded in an earlier switching phase to melt off frozen-out water and hydrocarbons; recovering resultant melted condensate of water and hydrocarbons and the liquid condensate from said first stage, and separating water from resultant liquid phases to recover said hydrocarbons.

2. A process according to claim 1, characterized in that the condensates produced during the regeneration of the loaded heat exchanger (218) and/or during the cooling of the gaseous mixture in the regenerated heat exchanger (220) are fed to a common separator (219).

3. A process according to claim 1, characterized in that gas extensively freed of hydrocarbons after flowing through the regenerated heat exchanger, is expanded (223) and warmed countercurrently with the gaseous mixture (224).

4. A process according to claim 1 wherein said hydrocarbons are gasoline.

* * * * *

UNITED STATES PATENT OFFICE
CERTIFICATE OF CORRECTION

PATENT NO. : 3,967,938
DATED : July 6, 1976
INVENTOR(S) : Werner DAESCHLER et al It is certified that error appears in the above-identified patent and that said Letters Patent are hereby corrected as shown below:

[75] Inventors: Should be -- Werner Daeschler, Munich;

Gerhard Frey, Munich; Walter Schramm, Munich, all of Germany --.

Signed and Sealed this

Ninth Day of November 1976

[SEAL]

Attest:

RUTH C. MASON
Attesting Officer

C. MARSHALL DANN
Commissioner of Patents and Trademarks